United States Patent [19]
Eckert

[11] Patent Number: 6,048,039
[45] Date of Patent: Apr. 11, 2000

[54] MOTOR VEHICLE BRAKING SYSTEM

[75] Inventor: Alfred Eckert, Bodenheim, Germany

[73] Assignee: ITT Manufacturing Enterprises Inc., Wilmington, Del.

[21] Appl. No.: 08/930,539

[22] PCT Filed: Feb. 23, 1996

[86] PCT No.: PCT/EP96/01292

§ 371 Date: Dec. 8, 1997

§ 102(e) Date: Dec. 8, 1997

[87] PCT Pub. No.: WO96/30239

PCT Pub. Date: Oct. 3, 1996

[30] Foreign Application Priority Data

Mar. 30, 1995 [DE] Germany ............ 195 11 694

[51] Int. Cl.[7] .................................................. B60T 7/12
[52] U.S. Cl. ............................ 303/113.4; 303/114.3
[58] Field of Search .................... 303/113.4, 114.3, 303/113.1, 3, 15, 10, 11, DIG. 3, DIG. 4, 155

[56] References Cited

U.S. PATENT DOCUMENTS

| | | | |
|---|---|---|---|
| 3,795,426 | 3/1974 | Sisson . | |
| 5,493,946 | 2/1996 | Schluter et al. | 303/113.4 |
| 5,709,437 | 1/1998 | Schluter et al. | 303/113.4 |
| 5,720,532 | 2/1998 | Steiner et al. | 303/113.4 |
| 5,816,667 | 10/1998 | Jokic | 303/113.4 |
| 5,833,327 | 11/1998 | Kozakai | 303/113.4 |
| 5,855,420 | 1/1999 | Lawrence | 303/113.4 |

FOREIGN PATENT DOCUMENTS

| | | |
|---|---|---|
| 0233360 | 8/1987 | European Pat. Off. . |
| 2951755 | 7/1981 | Germany . |
| 4017429 | 12/1990 | Germany . |
| 4213710 | 10/1993 | Germany . |
| 4234041 | 3/1994 | Germany . |
| 4309244 | 9/1994 | Germany . |
| 4324205 | 1/1995 | Germany . |
| 4340921 | 6/1995 | Germany . |
| 4409909 | 9/1995 | Germany . |
| 95/03196 | 2/1995 | WIPO . |

*Primary Examiner*—Matthew C. Graham
*Attorney, Agent, or Firm*—Rader, Fishman & Grauer PLLC

[57] ABSTRACT

A brake system for motor vehicles has a controllable pneumatic brake booster, the control valve of which can be activated independently of the volition of the driver by an electromagnet. A control unit structure consisting of a braking pressure control unit as well as a control valve position control unit produces signals which represent the voltage which is to be supplied to the electromagnet. In order to increase the quality of the delete control it is provided, in accordance with the invention, that the braking pressure control unit is formed by a parallel circuit of a first control unit (sequence control unit), which follows rapid temporal changes of the signal corresponding to nominal braking pressure, and of a second control unit (final value control unit), which follows slow changes or static values of the signal which correspond to the nominal braking pressure, whereby the output quantities of both of the control units are conveyed to a situational switching logic unit which, in accordance with a selection criterion, connects the output quantity of the first control unit or of the second control unit through to the position control unit.

12 Claims, 5 Drawing Sheets

{ 6,048,039 }

MOTOR VEHICLE BRAKING SYSTEM

BACKGROUND OF THE INVENTION

The invention relates to a brake system for motor vehicles, with an activating unit which consists of a pneumatic brake booster as well as a master brake cylinder which is connected at the outlet side to the same, and to which the wheel brakes are connected, whereby the control valve of the brake booster can be triggered, independently of the volition of the driver, by means of an electromagnet, by means of the armature of which one of the control valve sealing fitting units can be activated, with a brake pressure controller, to which is conveyed the standard difference between a signal corresponding to the nominal braking pressure and a signal corresponding to the actual braking pressure, which difference is formed in a first adding device and the output quantity of which, which corresponds to a nominal armature travel, is compared in a second adding device with a signal which corresponds to the actual armature travel, whereby the standard difference corresponding to the comparative result is conveyed to a position control unit which influences the position of the control valve, the output quantity of which corresponds to the electrical current which is to be supplied to the electromagnet.

Such a type of brake system is already known from international patent application WO 95/03196. The structure of the previously-known brake pressure controller represents a compromise between the control unit dynamic which is desired and the disturbance behavior of the control unit. If a highly dynamic or very rapidly operating control unit is used, then this has a gradated characteristic curve, which has noises and vibrations in the system, which act in an unpleasant manner, as its consequence.

In the case of a slowly operating control unit, greater imprecisions in changing operations (changes in the operational sign or of the direction) in regard to the nominal value must then be accepted in return.

It is thus the object of the present invention to propose measures which make possible a control with the following characteristics:

a) For the sequence control:

C High dynamics;

C Smooth, continuously adjustable control process;

C Rapid response behavior.

b) For disruption behavior, static control inputs, or final value control:

C Rapid stabilization of disturbances;

C No permanent standard deviation.

SUMMARY OF THE INVENTION

This object is achieved, in accordance with the invention, through the fact that the braking pressure control unit is formed by a parallel circuit of a first control unit (sequence control unit), which follows the rapid temporal changes of the signal corresponding to the nominal braking pressure, and a second control unit (final value control unit), which follows signals corresponding to the slow changes or to static final values, whereby the output quantities of both of the control units are conveyed to a situational switching logic unit which, in accordance with a selection criterion, connects the output quantity of the first or of the second control unit through to the position control unit.

Further details, characteristics and advantages of the invention proceed from the following description of two examples of implementation, with reference to the attached diagrams, in which the same reference numerals are used for individual parts which correspond to one another.

DETAILED DESCRIPTION OF THE DRAWINGS

Figure 1:
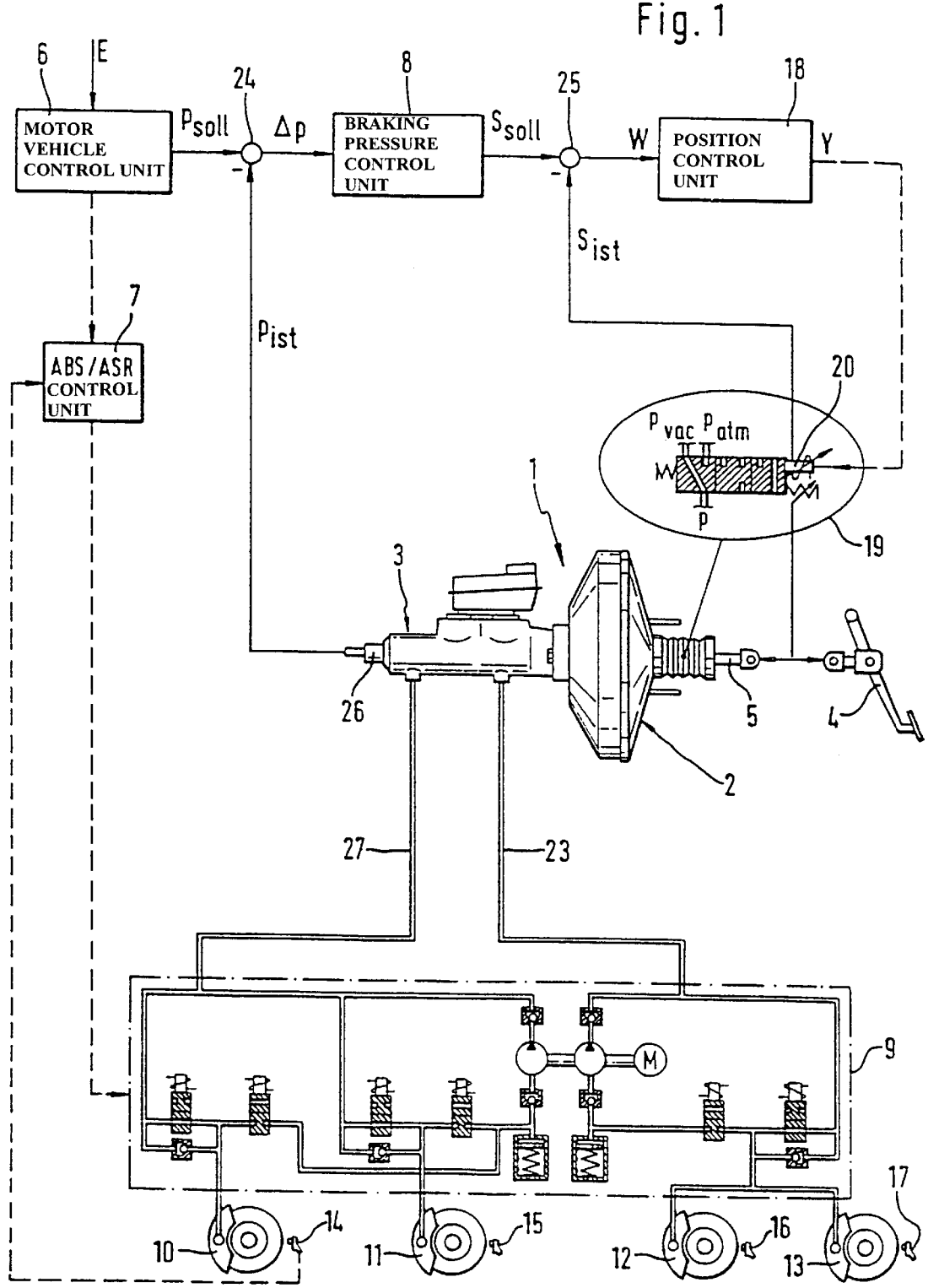
FIG. 1 shows one embodiment of the brake system in accordance with the invention, in a schematic representation.

The brake system for motor vehicles according to the invention which is depicted in FIG. 1 essentially consists of an activating unit 1, an electronic vehicle control unit 6, wheel brakes 10, 11, 12, 13, a second pressure modulator 9 which is positioned between the wheel brakes 10 to 13 and the activating unit 1, as well as an ABS/TCS control unit 7 which cooperates with the vehicle control unit 6, which produces control signals for the pressure modulator 9. One wheel sensor 14, 15, 16, 17 is assigned to the vehicle wheels, not depicted, the control signal of which sensor, which corresponds to the wheel speed, is conveyed to the ABS/TCS control unit 7. The activating unit 1, for its part, consists of a pneumatic brake booster which can be activated by means of an activating pedal 4, preferably a vacuum brake booster 2, to which a master brake cylinder 3, preferably a tandem primary cylinder, is connected at the outlet side, the pressure chambers of which, which are not depicted here, are connected, by way of the hydraulic lines 23, 27, to the pressure modulator 9. An activating rod 5, which makes possible an activation of a control valve 19, depicted only schematically, which controls the build-up of a pneumatic differential pressure within the casing of the vacuum brake booster 2, is connected to the activating pedal 4. An electromagnet 20 thereby makes an activation of the control valve 19 from the outside possible.

As is to be additionally gathered from FIG. 1, to the outlet side to the vehicle control unit 6, a second electronic control unit (braking pressure control unit) 8 is connected, which is fed with a control unit difference p, which is formed in a first adding device 24 between a nominal braking pressure signal $P_{nominal}$ produced by the vehicle control unit 6 on the basis of an input signal E which is delivered by a distance sensor, for example, and an actual braking pressure signal $P_{actual}$ delivered by the activating unit 1 or a pressure sensor 26 which detects the pressure prevailing in the primary brake cylinder. The output signal $S_{AW}$ of the braking pressure control unit 8 corresponds to the location or the position of the armature of the electromagnet 20 which activates the control valve 19 which it is desired to set. A control valve position actual value $S_{actual}$, which can be determined by means of a path sensor, for example, which is not depicted here, is subtracted from the armature position nominal value $S_{nominal}$ in a second adding device 25, and the standard difference W which thus arises is supplied to a subordinated third control unit (control valve position control unit) 18, the correcting variable Y of which serves for the triggering of the electromagnet 20.

Figure 2:
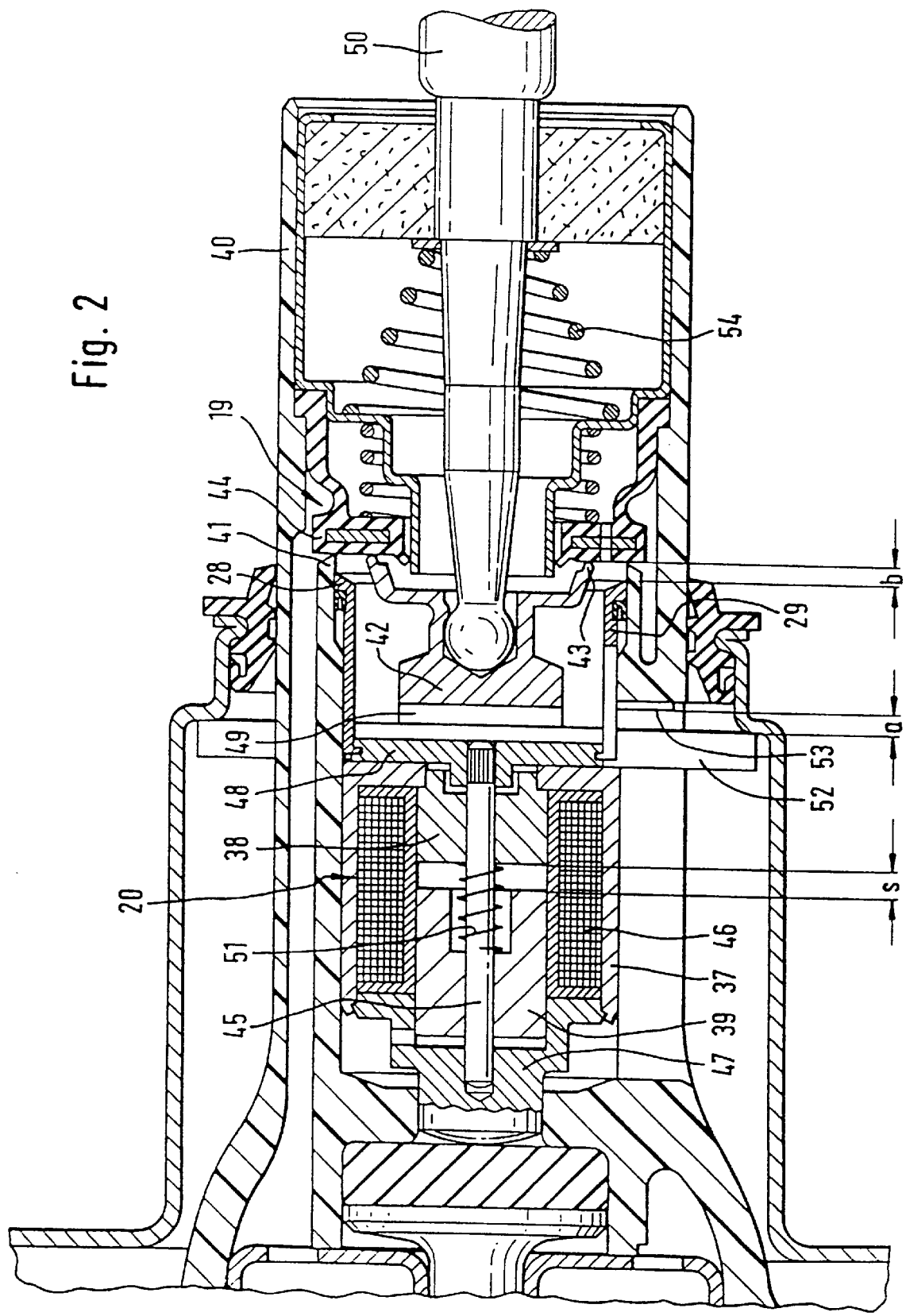
FIG. 2 shows the control group of the pneumatic brake booster in accordance with FIG. 1, in an axial section, partially cut away.

As FIG. 2, in particular, shows, the control valve 19 is accommodated in a control casing which is placed, in a sealed manner, in the casing of the brake booster 2 and consists of a first sealing fitting unit 41 which is formed on the control casing 40, a second sealing fitting unit 43 which is formed on a valve piston 42 which is connected with the activating rod 5, as well as a valve body 44 which cooperates with both sealing fitting units 41, 43.

In order to initiate an external activation of the brake booster 2 independently of the activating rod 5, a third sealing fitting unit 28 is positioned in a radial manner between the first sealing fitting unit 41 and the second sealing fitting unit 43; this third sealing fitting unit can be activated by means of the electromagnet 20 and is preferably positioned inside a casing 37 which is formed by an axial pot-shaped extension of the valve piston 42, and can therefore be displaced within the control casing 4 together with the valve piston 42.

The electromagnet 20 consists of a coil 46 which is placed onto a guide part 38 attached inside the casing 37, as well as a cylindrical armature 39 which is placed therein in a displaceable manner, which armature is connected, in a non-detachable manner, with a pin 45 which is conducted, on the one hand, into the guide part 38 and, on the other hand, into a sealing part 47 which seals off the casing 37. A pole surface which is positioned axially opposite to the armature 39 on the guide part 38 can thereby be preferably constructed as an external cone, in order to achieve a linearization of the force—path characteristics of the electromagnet 20. The pin 45 supports, on its end which is oriented to the activating rod 5, a force transmission plate 48, which is preferably formed in a rectangular manner and is positioned in a radial groove 49 of the valve piston 42, and which makes possible a transmission of the external activating force which is applied by the electromagnet 20 onto the third sealing fitting unit 28. The third sealing fitting unit 28 is, for this purpose, formed on a sheath casing 29, which is connected with the force transmission plate 48 and is conducted, in a sealed manner, within the control casing 40. A pressure spring 51, which holds the armature 39 in its starting position, in which the third sealing fitting unit 28 is positioned in an axially displaced manner (see distance b) relative to the second sealing fitting unit 43 which is placed on the valve piston 42, is positioned between the armature 39 and the guide part 38 partially projecting into the sealing part 47.

During an external braking which is initiated by the flow of current from the coil 46, the armature 39 is displaced to the right in the diagram, against the force of the pressure spring 51, through which the third sealing fitting unit 28 first comes to placement, after bridging the distance "b", against the sealing surface of the valve body 44. Through this placement, the first sealing fitting unit 41 which is formed on the control casing 40 is bypassed in an effective manner, so that no connection exists any longer between the pneumatic chambers of the brake booster 2, which chambers are not depicted. The third sealing fitting unit 28 and the valve body 44 subsequently move further along together, whereby the second sealing fitting unit 43 is opened and the ventilatable chamber of the brake booster 2 is ventilated. The movement of the third sealing fitting unit 28 lasts for long enough until the armature 39 is stopped on the guide part 38, and the aperture "s" between the two parts becomes zero. In the event that an activation force is lacking on the activating rod 5, the control casing 40 moves ahead, relative to the valve piston 42, by a distance which corresponds to the distance "a" between a transverse element 52 which limits the movement of the valve piston 42 and a stopping surface 53 which is formed on the control casing 40. The cause of this is the piston rod restoring spring 54 which, by means of the activating rod 5, moves the valve piston 42 to the right and causes the second sealing fitting unit 28 to close again. Since, however, the third sealing fitting unit 28, because of the solid connection of the electromagnet 20 and the valve piston 42, proceeds along in a synchronous manner, the aperture between the valve body 44 and the second sealing fitting unit 43 is held open and, specifically so, by the dimension s-b. Through this fact, the ventilatable chamber of the brake booster 2 is connected with the atmosphere, and a braking force is produced.

After the shutting off of the electromagnet 20, the armature 39, with the third sealing fitting unit 28, is moved, under the influence of the spring 51, to the left, as the result of which the third sealing fitting unit 28 is opened, while the valve body 44 closes the second sealing fitting unit 43. Since the first sealing fitting unit 41—as has been mentioned above—continues to remain open, the atmosphere is suctioned out of the ventilatable chamber, through the open connection between the pneumatic chambers, so that the pressure which is prevailing in the master brake cylinder 3 is reduced.

The ventilatable chamber has its air removed, through the open first sealing fitting unit 41, until the control group moves back into its starting position and the transverse element 52 is stopped on the casing of the brake booster 2. The control casing 40 can move for long enough until it comes to placement against the left side of the transverse element 52 in the diagram, and the first sealing fitting unit 41 is closed. The device is then in its detachable position.

Figure 3:
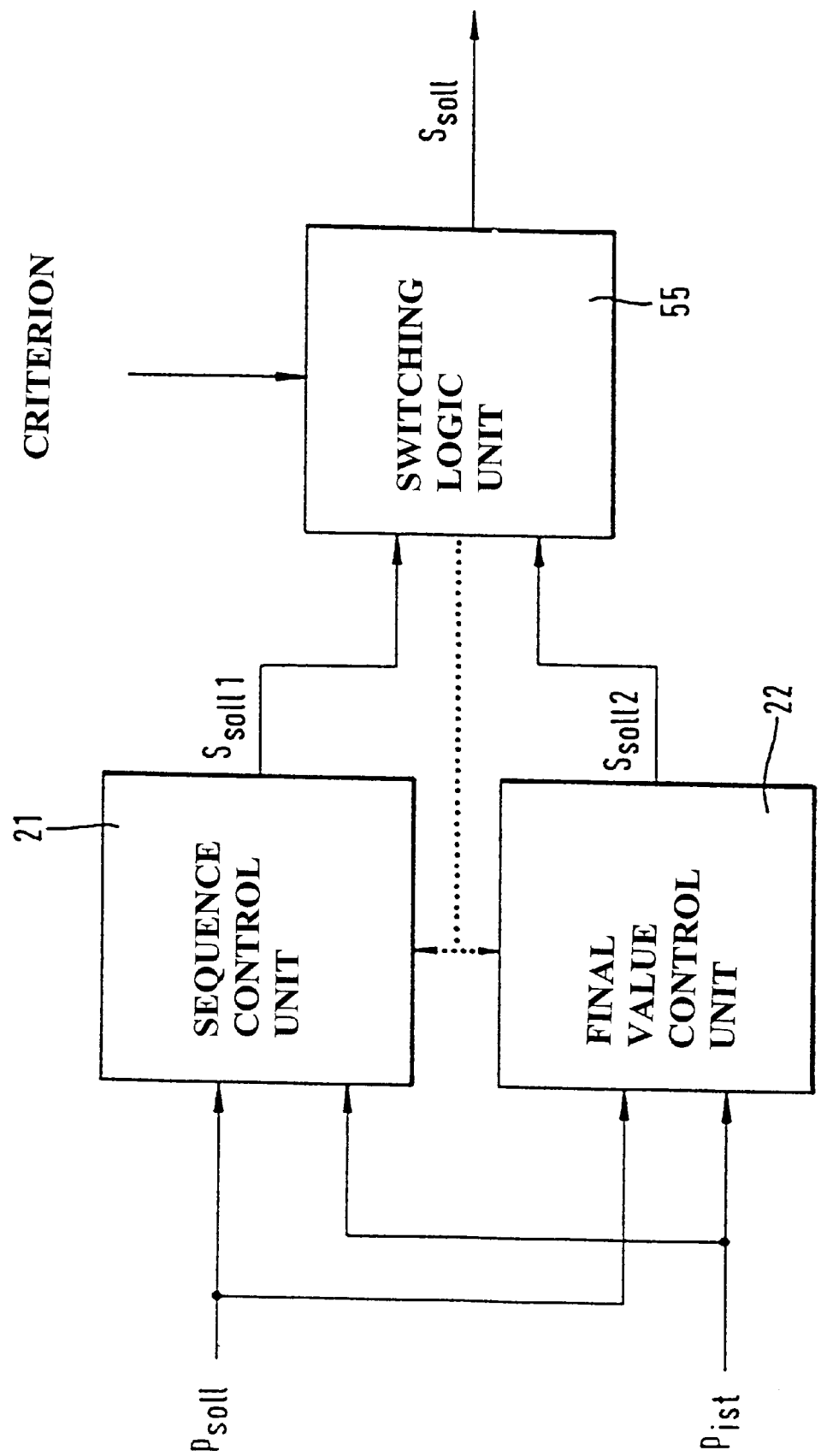
FIG. 3 shows the principle of the design of the braking pressure control unit, in a simplified schematic representation.

The principle of design of the braking pressure control unit 8 in accordance with the invention which is depicted in FIG. 3 shows that it is formed by a parallel circuit of a first or following control unit 21, as well as a second or final value control unit 22, to which a situational switching logic unit 55 is connected at the outlet side. Both of the control units 21, 22 fulfill the requirements which have been set, but do have weaknesses, however, in regard to the supplementary requirement. These weaknesses are compensated by the situational switching logic unit 55 which, after a control situation or a criterion which to be explained later has been identified, connects the output quantity $S_{nominal}$ of the sequence control unit 21, or the output quantity $S_{nominal2}$ of the final value control unit 22, to the position control unit 18. As the result, in the event of dynamic changes of the control input, the sequence control unit 21 comes into the control circuit and, in the event of very slow or static changes of the nominal value, the final value control unit 22 does so.

Figure 4:
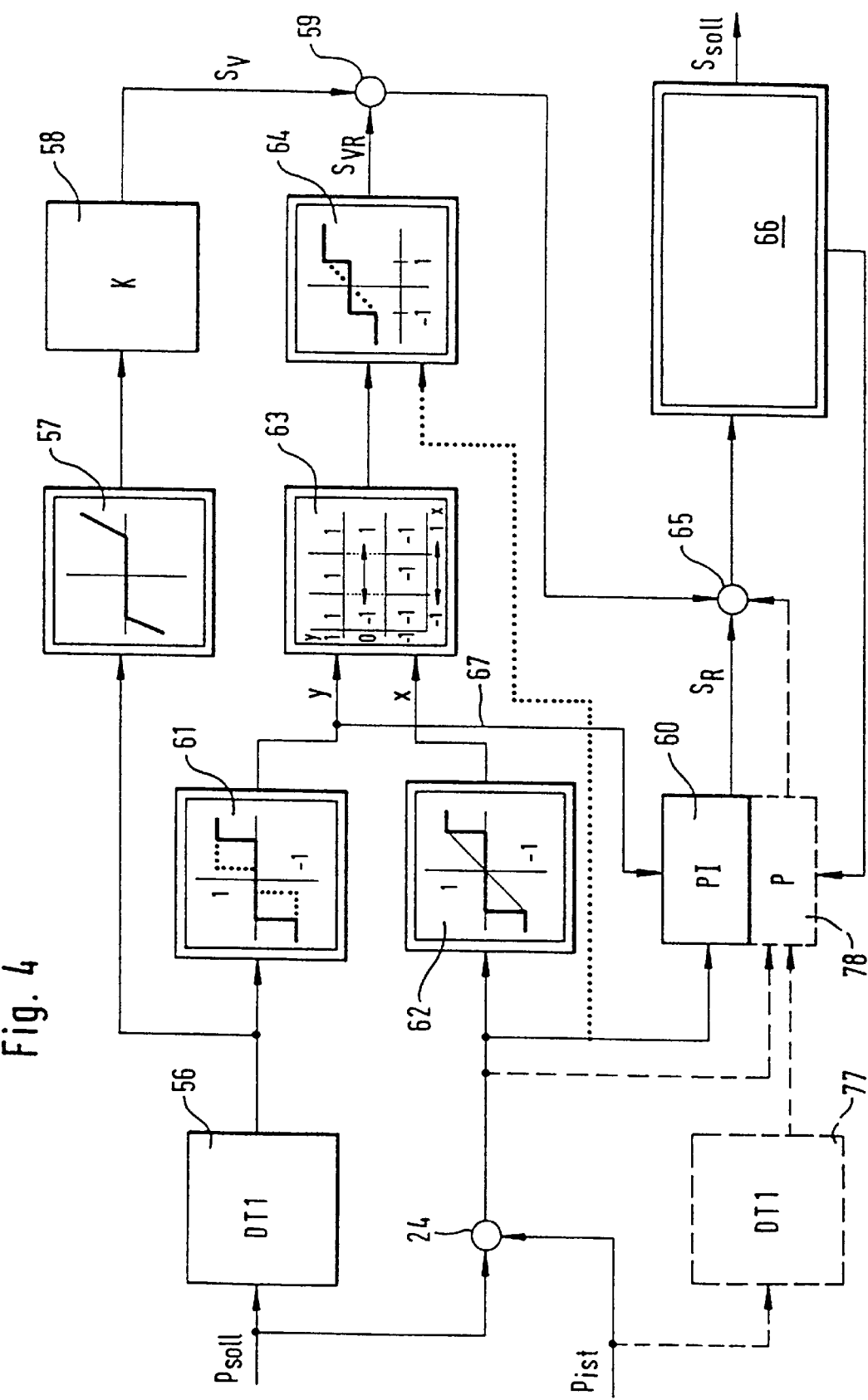
FIG. 4 shows a schematic block diagram of a first embodiment of the braking pressure control unit in accordance with FIG. 3.

In essential terms, the control unit structure which is depicted in FIG. 4 consists of an anticipatory position control branch 56, 57 and 58, the situational switching logic unit 61, 62 and 63 which has been noted previously, a non-linear transmission element 64 with a three-point characteristic curve, and a proportional—integrating PI-control unit 60, as well as a restriction logic unit 66.

The anticipatory position control branch, for its part, consists of a differentiating DT1-filter 56, to which the signal $P_{nominal}$ which corresponds to the nominal braking pressure value is conveyed; a dead zone 57, which only switches through the values of the filtered nominal pressure gradients $\dot{P}_{nominal}$, formed in the DT1 filter 56, which exceed or fall short of a certain threshold; as well as an amplifier 58, the output quantity S, of which is conveyed to an adding device 59.

The switching logic unit is formed by a three-point element 61 with, under certain circumstances, a hysteresis for the recognition of the sign of the nominal braking pressure gradient $\dot{P}_{nominal}$; a limiting unit 62 with an additional amplification for the standardizing of the control unit difference $\Delta p$ which is formed in the first adding device 24; as well as a characteristics diagram 63 to which the output signals y, x of the function blocks 61 and 62 are conveyed as input quantities, which blocks are used as coordinates for the selection of a value which is conveyed to the non-linear transmission element 64, the three conditions of which "−1", "0", "1" correspond to a build-up or a reduction of pressure, as well as a pressure maintaining phase. The output quantity $S_{VR}$ of the non-linear transmission element 64 is additionally added, in the adding device 59, to the output quantity $S_V$ of the anticipatory control unit, whereby the result of the addition is additionally added, in a third adding device 65, to the output quantity $S_R$ of the PI control unit 60, and is subsequently restricted to realizable values in a restriction logic unit 66, which monitors the I-portion of the PI control unit 60 at the same time. The sequence control unit 21 which has been mentioned above accordingly consists of the anticipatory control branch 56, 57, 58, the non-linear transmission element 64, as well as the PI control unit 60, whereas the final value control unit 22 is formed by the combination of the limiting unit 62 with the characteristics diagram 63, the non-linear transmission element 64, as well as the PI control unit 60.

For the following description of the function of the braking pressure control unit which is depicted in FIG. 4, it is assumed that a positive uniform change of the nominal value (incline) is conveyed, as an input quantity, to the anticipatory control branch, so that a rectangular signal appears, in an idealized form, at the output of the differentiating DT1-filter 56. If the value of the rectangular signal is greater than the threshold which has been preset by the dead zone 57, then a rectangular signal appears at its outlet, which signal, after an amplification by a factor K, is conveyed, as a first nominal path signal $S_V$, to the adding device 59. The output quantity of the DT1-filter 56 is, at the same time, conveyed to the three-point element 61 which has, under certain circumstances, a hysteresis, the output quantity y of which element, on the presupposition that the value of the stated signal exceeds the switching threshold which has been preset by the three-point element 61, assumes the value of a A1", which serves as a corresponding coordinate for the characteristics diagram 63. As is to be inferred from the contents of the characteristics diagram 63, a signal $Y_a$ which corresponds to a "1" appears at the outlet of the characteristics diagram 63 and, specifically so, independently of the quantity of the other coordinate x which is delivered by the limiting unit 62 and, in this case, remains ineffective for the characteristics diagram 63. It is evident from the contents of the characteristics diagram 63, furthermore, that the coordinate x which arises from the limited standard difference can only become effective if the first-stated coordinate is "y=0". On the basis of the process which has just been outlined, a signal $S_{VR}$, which represents an armature interval which is necessary for the building up of pressure, then appears at the outlet of the transmission element 64. This signal is then additionally added, in the adding device 59, to the output signal of the anticipatory control unit $S_V$ which has just been referred to.

For the description of the control, it is assumed that, before the beginning of the change of the nominal value, the standard difference was "$\Delta p=0$". In the change of the nominal value which has just been described, a positive standard difference "$\Delta p>0$" arises, which is amplified in the PI control unit 60 and integrated for long enough until "$\Delta p$" has become "0" again. As long as "y=1" remains, the limiting unit 62 continues to be ineffective. The output quantity $S_R$ is, in an additional adding device 65, added to the result of the addition which was carried out in the adding device 59, whereby the result of the addition is conveyed to a restriction logic unit 66, the output quantity $S_{nominal}$ of which corresponds to the desired armature interval, and which additionally controls or restricts the I-portion of the PI control unit 60. As is to be further inferred from the diagram, a P-control unit 78, to which a second differentiating DT1-filter 77 is connected in series, can additionally be applied, in addition to the PI control unit 60. With small nominal pressure gradients, a value "y=0" appears on the outlet of the three-point element 61, so that the output quantity of the characteristics diagram 63 corresponds to the value of the other coordinate x, and a value which corresponds to x is consequently issued between the pressure reduction position and the pressure build-up position. Since the dead zone 57 does not allow any small changes of nominal value to pass through, the anticipatory control unit has no influence on the control unit process. The signal path which is indicated in FIG. 4 by the reference numeral 67 shows that the parameters of the PI control unit 60 can be influenced or changed by the situational switching logic unit 61, 62, 63.

Figure 5:
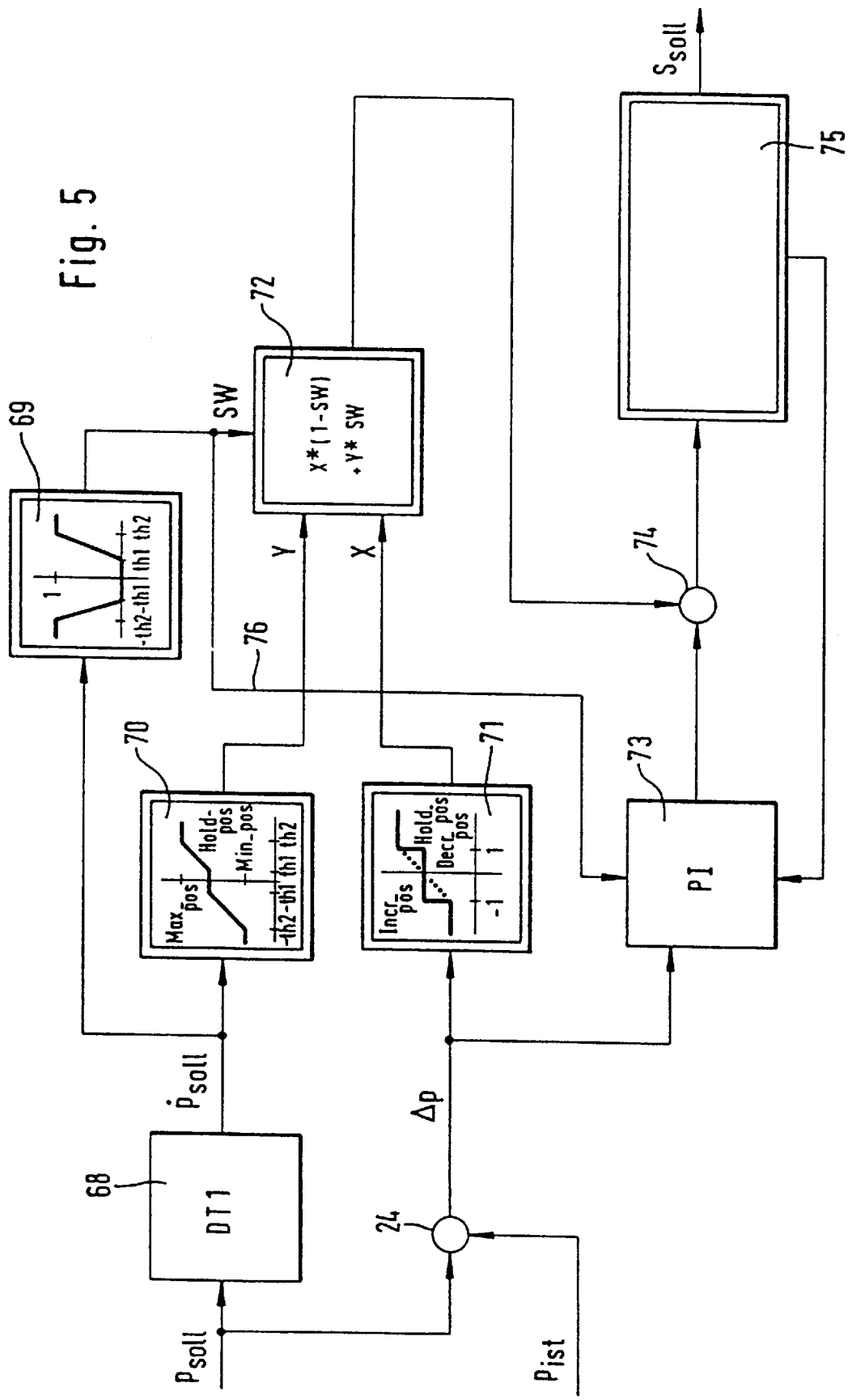
FIG. 5 shows a schematic block diagram of a second embodiment of the braking pressure control unit in accordance with FIG. 3.

The control unit structure which is depicted in FIG. 5 essentially consists of a differentiating DT1-filter 68, a signal processing unit 69, an anticipatory control unit 70, a non-linear control unit 71 with a three-point characteristic curve, a weighting unit 72, as well as a PI control unit 73 with a restriction logic unit 75 connected at the outlet side. As in the example of implementation which is depicted in FIG. 4, a P-control unit, which is not depicted, to which a differentiating DT1-filter is connected in series, can be used in addition to the PI control unit 73.

The output signal of the DT1 filter 68 which represents the nominal braking pressure gradient $\dot{P}_{nominal}$ is supplied, on the one hand, as an input quantity to the signal processing unit 69 and, on the other hand, to the anticipatory control unit 70. The standard difference $\Delta p$ which arises in the adding device 24 which has just been mentioned serves as an input quantity, on the one hand, to the non-linear control unit 71 and, on the other hand, to the PI control unit 73. The signal processing unit 69 produces, in dependence on a characteristic curve which is deposited therein, a control signal SW for the weighting unit 72, to which the output signals Y, X of the anticipatory control unit 70, as well as of the non-linear control unit 71, are conveyed as input quantities, the output quantity of which corresponds to a combination of the output signal which is formed in accordance with the formula:

$$X^* (1=SW)+Y^*SW.$$

The output signal Y of the anticipatory control unit 70 is assigned to the nominal braking pressure gradient $\dot{P}_{nominal}$ which is delivered by the DT1 filter 68, while the output signal X arises, through the processing of the standard difference $\Delta p$, in the non-linear control unit or modified three-point switch 71.

If a smaller value of the nominal braking pressure gradient $\dot{P}_{nominal}$, which corresponds to the range from −th1 to +th1 of the characteristic curve which has been deposited in the signal processing unit 69, appears on the outlet of the DT1 filter 68, then this produces a control signal "SW=0, so that the output quantity of the weighting unit 72 corresponds to the output quantity X of the modified three-point switch 71, which is additionally added, in the second adding device 74, to the output quantity of the PI control unit 73, whereby the result of the addition is conveyed, as in the first example, to the restriction logic unit 75.

In changes of nominal value which are greater than "+th1", a control signal "SW>0" appears at the outlet of the signal processing unit 69, so that a combination of correspondingly weighted signals Y and X appears at the outlet of the weighting unit 72. In this case, the "Y" portion increases and the "X" portion decreases. A smooth change between the control unit modes is consequently achieved.

The signal path which is designated in FIG. 5 with the reference FIG. 76 shows that the parameters of the PI control unit 73 can be influenced or changed by the signal processing unit 69.

The sequence control unit 21 which has just been mentioned accordingly essentially consists of the differentiating DT1-filter 68, the anticipatory control unit 70, the weighting unit 72 which forms the above-stated switching logic unit 55, as well as the PI control unit 73 which is switched in parallel thereto, while the final value control unit 22 is formed by the combination of the non-linear control unit 71 with the weighting unit 72, as well as the PI control unit 73.

An additional embodiment, in which the weighting unit 72 has elements of non-sharp ("fuzzy") logic with corresponding control units, is also conceivable. By means of this measure, a non-linear smooth change between the control unit modes would be achieved as a function of the nominal pressure and gradient, and of the control unit difference and gradient.

I claim:

1. A brake system for motor vehicles comprising:
   an activating unit including a pneumatic brake booster having an outlet side and further including a master cylinder connected to the outlet side of the brake booster;
   a plurality of wheel brakes connected to the master cylinder,
   the brake booster includes a control valve that is operable by an electromagnet having an armature for actuating one control valve sealing fitting unit;
   a brake pressure controller receives a control unit difference value that is calculated by a first adding device between a nominal braking pressure signal based on a distance sensor output and an actual braking pressure signal based on a pressure sensor output and wherein the brake pressure controller outputs a signal corresponding to the position of the armature of the electromagnet;
   a second adding device receives a signal from a sensor indicating actual armature travel and compares the actual armature travel to a nominal armature travel and generates a standard difference signal for sending to a control valve position control unit;
   the control valve position control unit influences the position of the control valve by generating an output signal corresponding to a level of electrical current to be supplied to the electromagnet; and
   wherein the braking pressure control unit includes a parallel circuit of a first control unit that monitors the rapid temporary changes of the signal corresponding to the nominal braking pressure and a second control unit that monitors the slow changes of the signal corresponding to the nominal braking pressure, the first and second control units each output respective signals to a situational switching logic unit that compares the respective signals to predetermined selection criteria and selectively sends one of the respective output signals from the first or the second control unit to the control valve position control unit.

2. A brake system for motor vehicles in accordance with claim 1, wherein the first control unit includes an anticipatory control branch processing the nominal braking pressure gradient, a non-linear transmission element with a three-point characteristic curve which can be triggered by the output quantity of the switching logic unit, and a proportionally integrated control unit, whereby the output quantity of the anticipatory control branch is additionally added to the output quantity of the non-linear transmission element and the result of the addition is additionally added to the output quantity of the proportionally integrated control unit, while the second control unit is formed with an additional amplification for the standardizing of the standard difference, with the non-linear transmission element and the proportionally integrating control unit.

3. A brake system for motor vehicles in accordance with claim 2, wherein the sum of the output quantities of the anticipatory control branch, of the non-linear transmission element, and of the proportionally integrating control unit, is supplied to a restriction logic unit and controls an integrating portion of the proportionally integrated control unit.

4. A brake system for motor vehicles in accordance with claim 2, wherein the switching logic unit includes a three-point element for the recognition of the sign of the nominal braking pressure gradient, of the limiting unit, and a characteristics diagram, the coordinates of which are formed by the output quantities of the three-point element and the limiting unit, and the non-linear transmission element can be triggered by its output quantity.

5. A brake system for motor vehicles in accordance with claim 4, wherein the three-point element has a hysteresis.

6. A brake system for motor vehicles in accordance with claim 2, wherein the anticipatory control branch includes a differentiating filter, a dead zone, and an amplifier which is connected at the outlet side to the dead zone.

7. A brake system for motor vehicles in accordance with claim 2, wherein parameters of the proportionally integrating control unit can be influenced by the output quantity of the three-point element.

8. A brake system for motor vehicles in accordance with claim 1, wherein the sequence control unit includes an anticipatory control unit, a weighting unit, and a proportionally integrating control unit switched in parallel thereto, whereby the nominal braking pressure gradient is supplied to the anticipatory control unit as an input quantity, and an output quantity of the anticipating control unit is supplied to the weighting unit, while the second control unit is formed by a combination of a non-linear control unit with a saturation characteristic curve and of the weighting unit with the proportionally integrating control unit, whereby a signal processing unit is provided, which is supplied with an input quantity of the nominal braking pressure gradient, and which produces a control signal for the weighting unit, the output quantity of which corresponds to a combination of the weighted output signals of the anticipatory control unit or of the non-linear control unit.

9. A brake system for motor vehicles in accordance with claim 8, wherein the output quantity of the weighting unit is formed in accordance with the formula:

$X*(1-SW)+Y*SW.$

10. A brake system for motor vehicles in accordance with claim 8, wherein the sum of the output quantities of the weighting unit and of the proportionally integrating control unit is conveyed to a restriction logic unit, which limits it to an implementable value and controls an integrating portion of the proportionally integrating control unit.

11. A brake system in accordance with claim 8, wherein the parameters of the proportionally integrating control unit are influenced by the control signal of the signal processing unit.

12. A brake system in accordance with claim 2, wherein the proportionally integrating control unit is supplemented by a proportional control unit with a differentiating filter which is connected in series.

* * * * *